United States Patent
Vankamamidi et al.

(10) Patent No.: US 11,513,702 B2
(45) Date of Patent: Nov. 29, 2022

(54) PLACEMENT OF METADATA ON DATA STORAGE DRIVES IN A FIRST STORAGE ENCLOSURE OF A DATA STORAGE SYSTEM

(71) Applicant: EMC IP Holding Company LLC, Hopkinton, MA (US)

(72) Inventors: Vamsi K. Vankamamidi, Hopkinton, MA (US); Philippe Armangau, Acton, MA (US); Daniel E. Cummins, Hudson, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 243 days.

(21) Appl. No.: 16/655,650

(22) Filed: Oct. 17, 2019

(65) Prior Publication Data
US 2021/0117112 A1    Apr. 22, 2021

(51) Int. Cl.
*G06F 3/06* (2006.01)

(52) U.S. Cl.
CPC .......... *G06F 3/0631* (2013.01); *G06F 3/0604* (2013.01); *G06F 3/0659* (2013.01); *G06F 3/0679* (2013.01)

(58) Field of Classification Search
CPC .... G06F 3/0631; G06F 3/0679; G06F 3/0659; G06F 3/0604; G06F 3/0647; G06F 3/0685; G06F 3/0611
See application file for complete search history.

(56) References Cited

U.S. PATENT DOCUMENTS

| | | | |
|---|---|---|---|
| 7,293,133 B1* | 11/2007 | Colgrove | G06F 3/0608 |
| | | | 711/111 |
| 8,010,810 B1 | 8/2011 | Fitzgerald et al. | |
| 8,700,832 B1 | 4/2014 | Ramakrishnan et al. | |
| 9,535,977 B1 | 1/2017 | Joyce et al. | |
| 10,437,485 B2 | 10/2019 | Gao et al. | |
| 10,437,502 B2 | 10/2019 | Shadrin et al. | |
| 10,552,085 B1* | 2/2020 | Chen | G06F 3/0647 |
| 2016/0350239 A1* | 12/2016 | Colline | G06F 13/102 |
| 2017/0192892 A1* | 7/2017 | Pundir | G06F 12/0873 |
| 2018/0239555 A1* | 8/2018 | Cao | G06F 3/0608 |

* cited by examiner

*Primary Examiner* — Jason W Blust
(74) *Attorney, Agent, or Firm* — BainwoodHuang

(57) ABSTRACT

A data storage system in which data storage space for storing data storage metadata is selectively allocated from non-volatile data storage devices contained in a first storage enclosure. The first storage enclosure is directly connected to at least one storage processor of the data storage system, and the data storage system further includes at least one secondary storage enclosure that is indirectly connected to the storage processor. Data storage metadata is generated within the data storage system, and the data storage metadata generated within the data storage system is stored into the data storage space that was selectively allocated for storing data storage metadata from the non-volatile data storage devices contained in the first storage enclosure.

19 Claims, 5 Drawing Sheets

PLACEMENT OF METADATA ON DATA STORAGE DRIVES IN A FIRST STORAGE ENCLOSURE OF A DATA STORAGE SYSTEM

TECHNICAL FIELD

The disclosed technology relates generally to storing metadata in a data storage system, and more specifically to technology for selectively storing data storage metadata on data storage drives contained in a first storage enclosure of a data storage system.

BACKGROUND

Data storage systems are arrangements of hardware and software that include non-volatile data storage devices (e.g. electronic flash drives, magnetic disk drives, and/or optical drives) that are used to provide non-volatile storage for processing I/O (Input/Output) requests (i.e. writes and/or reads) that are received from one or more hosts (e.g. host computers). The host I/O requests that are processed by a data storage system may include block I/O requests as well as file I/O requests. The host I/O requests indicate host data that is stored in logical volumes of non-volatile data storage that are contained in and maintained by the data storage system. The data storage system performs various data storage services that organize and secure host data received from host computers on the non-volatile data storage devices of the data storage system.

SUMMARY

While processing received host I/O requests and providing related data services, a data storage system generates and/or uses internal data storage metadata. For example, data storage metadata generated and/or used by a data storage system may include without limitation one or more of the following, as well as other specific types of metadata:

i) Mapping metadata (e.g. a mapping tree or the like) generated by and/or used by mapping logic to identify the locations of blocks of physical non-volatile storage that are mapped to corresponding portions of the logical address space of a logical volume accessed by host I/O requests received and processed by the data storage system, ii) Mapped RAID (Redundant Array of Independent Disks) metadata generated by and/or used by mapped RAID logic, such as metadata (e.g. one or more tables, etc.) that describes how host data is striped across physical extents of non-volatile storage that are allocated to support mapped RAID, iii) Snapshot metadata generated by and/or used by snapshot logic, such as metadata that indicates and/or describes (e.g. points to) point in time copies referred to as "snapshots" that the data storage system captures of storage objects such as logical volumes, LUNs (Logical Units), and/or other specific types of storage objects, iv) Data deduplication metadata generated by and/or used by data deduplication logic, such as one or more data structures (e.g. a table or the like) that associate crypto-digests of previously stored blocks of host data with the locations in non-volatile storage at which the corresponding blocks of host data were stored, v) Data compression metadata generated by and/or used by data compression logic, such as indications (e.g. pointers) of locations in non-volatile storage at which previously compressed host data is stored, and/or indications of the specific type(s) of compression (e.g. compression keys, compression algorithms, etc.) that were used to compress the previously compressed host data, vi) Thin provisioning metadata generated by and/or used by thin provisioning logic, such as a data structure (e.g. a bit map) indicating which portions of the logical address space of a data storage object (e.g. a thin LUN or logical volume) have been allocated non-volatile data storage to handle received host I/O requests directed to the data storage object, and/or vii) Logging metadata generated by and/or used by logging logic, such as a transaction log or the like storing metadata changes resulting from host I/O requests received by the data storage system, and that can be "replayed" to recover the data storage system to a consistent state after a system crash.

Access by the storage processor of a data storage system to internal data storage metadata is important for both the resiliency and the performance of a data storage system. For example, access to mapping metadata is critical for data storage system resiliency because loss of some or all of the mapping metadata may prevent the data storage system from locating host data that was previously stored in non-volatile data storage, resulting in data loss. The impact of losing even one block of data storage metadata can be very high. For example, loss of a single block of mapping metadata could potentially result in the loss of the mappings needed by the data storage system to access hundreds of gigabytes (GBs) of host data previously stored in non-volatile data storage.

Access by the storage processor to internal data storage metadata is also important for the performance of the data storage system with regard to processing host I/O requests. For example, in order to access host data previously stored in non-volatile data storage, multiple blocks of metadata may need to be read, e.g. in order to traverse a mapping tree that stores mappings between logical addresses of host data within a logical volume (e.g. offsets, logical block numbers, etc.) and corresponding physical locations of portions (e.g. blocks) of non-volatile data storage. As a result, improving access times for internal data storage metadata may improve access times for host data stored in non-volatile storage, and may have an even greater impact on performance of the data storage system with regard to I/O request processing than simply improving access times for the host data stored in non-volatile storage.

Various operational factors, such as the total amount of internal data storage metadata that must be stored, and/or other factors, may result in some amount of the internal data storage metadata generated and/or used by a data storage system being stored in the non-volatile data storage of the data storage system instead of memory. Some previous systems have exhibited shortcomings in this regard. In general, data storage systems may include multiple storage enclosures, each of which contains (e.g. has directly connected thereto) one or more non-volatile data storage devices. For purposes of explanation, the storage enclosures of a data storage system are referred to herein as a first storage enclosure that is directly connected to at least one storage processor of the data storage system, and one or more secondary storage enclosures that are indirectly connected to the storage processor. For example, a first storage enclosure may be connected directly to the storage processor, a second storage enclosure may then be connected to the first storage enclosure, a third storage enclosure may then be connected to the second storage enclosure, and so on. The second storage enclosure, third storage enclosure, and so on, that are indirectly connected to the storage processor through other storage enclosures, are referred to herein for purposes of explanation as secondary storage enclosures. In some cases, such secondary storage enclosures may consist of or include what are sometimes generally referred to as "expansion" storage enclosures. The connections to the secondary storage enclosures extending out from the first storage enclosure may form what is sometimes referred to as a "daisy chain" of cables, such that a first external cable connects the second storage enclosure to the first storage enclosure, a second external cable connects the third storage enclosure to the second storage enclosure, and so on.

Some previous data storage systems have operated by storing internal data storage metadata onto data storage devices that are contained in secondary storage enclosures. For example, some previous systems have distributed internal data storage metadata evenly across all storage enclosures of the data storage system. However, storing internal data storage metadata on data storage devices in secondary storage enclosures results in a relatively high risk of losing the data storage metadata, thus reducing system resiliency, since data storage devices in secondary storage enclosures are exposed to faults specifically related to external cabling, such as inadvertent cable pulls, that may cause all data storage devices in one or more secondary storage enclosure to go offline. In contrast, data storage devices contained in the first storage enclosure are not exposed to such cabling related faults, since the first storage enclosure is directly connected to the storage processor. Moreover, in previous systems that spread internal data storage metadata across secondary storage enclosures of the data storage system, any fault causing even one of the secondary enclosures to go offline could result in all of the host data that is stored by the data storage system becoming unavailable.

Storing internal data storage metadata in non-volatile data storage devices contained in secondary storage enclosures may also have a negative impact on the performance of the data storage system with regard to processing host I/O requests, since access times may increase with each additional "hop" that must be traversed between the storage enclosures that must be traversed. When metadata must be accessed while processing a host I/O request (e.g. when accessing mapping metadata needed to locate the physical location of host data in non-volatile storage during processing of a read host I/O request), such higher access times for accessing the metadata may result in higher overall latency with regard to accessing the host data stored in non-volatile storage.

To provide improvements with regard to the above described and other technical shortcomings of previous systems, new technology is disclosed herein in which data storage space is selectively allocated for storing data storage metadata from non-volatile data storage devices that are contained in a first storage enclosure of the data storage system. The first storage enclosure is directly connected to at least one storage processor of the data storage system, and the data storage system further includes at least one secondary storage enclosure that is indirectly connected to the storage processor. Data storage metadata is generated within the data storage system, and the data storage metadata generated within the data storage system is stored into the data storage space that was selectively allocated for storing the data storage metadata from the non-volatile data storage devices contained in the first storage enclosure.

For example, selectively allocating data storage space for storing data storage metadata may include selecting available data storage space that is located in non-volatile data storage devices contained in the first storage enclosure over other available data storage space that is located in non-volatile data storage devices contained in the secondary storage enclosure.

In another example, host data may be moved from the non-volatile data storage devices contained in the first storage enclosure to non-volatile data storage devices contained in the secondary storage enclosure in order to create data storage space that is available for allocation from the non-volatile data storage devices contained in the first storage enclosure to store the data storage metadata.

In another example, unused data storage space may be identified in the non-volatile data storage devices contained in the first storage enclosure in order to create data storage space available for allocation from the non-volatile data storage devices contained in the first storage enclosure to store the data storage metadata.

In another example, the data storage metadata may be evenly distributed across the non-volatile data storage devices contained in the first storage enclosure, such that each non-volatile data storage device in the first storage enclosure stores the same amount of data storage metadata.

In another example, the data storage metadata may include mapping metadata that identifies the locations of blocks of physical non-volatile storage that are mapped to corresponding portions of a logical address space of at least one logical volume that is accessed by host I/O requests received and processed by the data storage system.

The disclosed technology may provide significant improvements over previous technologies. For example, improvements may be provided by the disclosed technology in both the resiliency and the performance of the data storage system. By storing internal data storage metadata in non-volatile data storage devices that are contained in the first storage enclosure of the data storage system, the disclosed technology reduces the risk of loss of data storage metadata due to cabling related faults (e.g. inadvertent cable pulls) and/or other faults that may occur with regard to the secondary storage enclosures, thereby increasing the resiliency of the data storage system. In addition, storing the data storage system's internal data storage metadata in the first storage enclosure may significantly improve the performance of the data storage system by decreasing metadata access times, thereby improving data storage system performance when processing received host I/O requests.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed on illustrating the principles of various embodiments of the disclosed technology.

DETAILED DESCRIPTION

Figure 1:
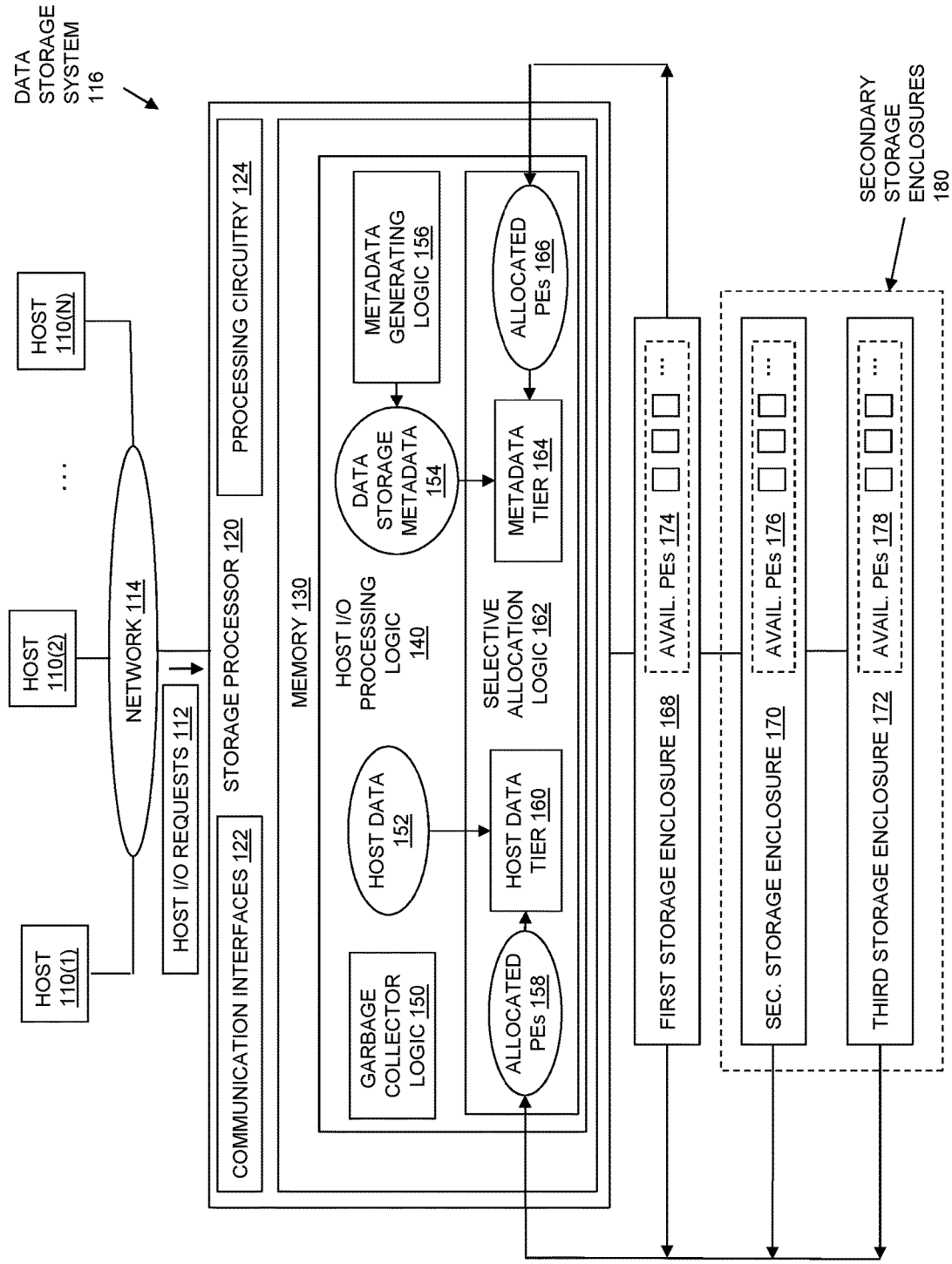
FIG. 1 is a block diagram showing an example of components in some embodiments while selectively allocating data storage space from non-volatile data storage devices contained in a first storage enclosure of a data storage system, generating data storage metadata, and storing the data storage metadata into the selectively allocated data storage space located in the non-volatile data storage devices contained in the first storage enclosure.

Embodiments of the invention will now be described. The embodiments described herein are only examples of how features and principles of the invention may be embodied. The invention itself is accordingly broader than the specific examples described below.

The technology disclosed herein improves data storage system resiliency and performance by storing data storage metadata in non-volatile data storage devices that are contained in a first storage enclosure of the data storage system. During operation, data storage space is selectively allocated for storing data storage metadata from the non-volatile data storage devices that are contained in the first storage enclosure. The first storage enclosure is directly connected to at least one storage processor of the data storage system. The data storage system further includes at least one secondary storage enclosure that is indirectly connected to the storage processor. Further during operation, data storage metadata is generated within the data storage system, and the data storage metadata that is generated within the data storage system is then stored into the data storage space that was selectively allocated for storing data storage metadata from the non-volatile data storage devices that are contained in the first storage enclosure.

In some embodiments, the disclosed technology may selectively allocate data storage space for storing data storage metadata at least in part by selecting available data storage space that is located in the non-volatile data storage devices that are contained in the first storage enclosure over other available data storage space that is located in non-volatile data storage devices that are contained in one or more secondary storage enclosures.

In some embodiments, the disclosed technology may move host data from the non-volatile data storage devices that are contained in the first storage enclosure to non-volatile data storage devices that are contained in the secondary storage enclosure in order to create data storage space that is available for allocation from the non-volatile data storage devices contained in the first storage enclosure to store data storage metadata.

In some embodiments, the disclosed technology may identify unused data storage space in the non-volatile data storage devices that are contained in the first storage enclosure in order to create data storage space that is available for allocation from the non-volatile data storage devices that are contained in the first storage enclosure to store the data storage metadata.

In some embodiments, the disclosed technology may evenly distribute the data storage metadata across the non-volatile data storage devices that are contained in the first storage enclosure, such that each non-volatile data storage device contained in the first storage enclosure stores the same amount of data storage metadata.

In some embodiments, the data storage metadata stored by the disclosed technology into the non-volatile data storage devices contained in the first storage enclosure may include mapping metadata that identifies the locations of blocks of physical non-volatile storage that are mapped to corresponding portions of a logical address space of at least one logical volume that is accessed by host I/O requests received and processed by the data storage system.

FIG. 1 shows an example of an operational environment in which embodiments of the disclosed technology may operate, and an illustrative embodiment of the disclosed technology. As shown in FIG. 1, one or more host computers ("Hosts"), shown as host computers 110(1) through 110(N), and/or host applications executing in whole or in part on host computers 110(1) through 110(N), access non-volatile data storage provided by Data Storage System 116 over a Network 114. Hosts 110 may consist of or include one or more physical computers, and/or one or more virtual machines executing in a virtual execution environment.

Data Storage System 116 includes at least one Storage Processor 120, and multiple storage enclosures including i) a first storage enclosure that is directly connected to Storage Processor 120, shown by First Storage Enclosure 168, and ii) one or more secondary storage enclosures that are each indirectly connected to Storage Processor 120 through at least one other storage enclosure, shown by Secondary Storage Enclosures 180. While in the example of FIG. 1 the Secondary Storage Enclosures 180 are shown for purposes of illustration including two storage enclosures, e.g. Second Storage Enclosure 170 and Third Storage Enclosure 172, the disclosed technology is not limited to configurations or embodiments having any specific number of secondary storage enclosures.

Each of the storage enclosures shown in FIG. 1 contains (e.g. has directly connected thereto) one or more non-volatile data storage devices. The non-volatile data storage devices contained in the storage enclosures may include magnetic disk drives, electronic flash drives, optical drives, and/or other types of non-volatile data storage devices.

First Storage Enclosure 168, and/or the non-volatile data storage devices contained therein, may, for example, be directly connected to Storage Processor 120 through a high speed bus, such as PCI Express (Peripheral Component Interconnect Express) or the like. In some embodiments, Storage Processor 120 may also be contained within the First Storage Enclosure 168.

One or more of the Secondary Storage Enclosures 180 may, for example, include or consist of what is sometimes referred to a an "expansion" storage enclosure, such as a SAS (Serial-Attached SCSI (Small Computer System Interface)) expander or the like, and contains the non-volatile data storage devices that are directly connected thereto. The connections to each one of the storage enclosures in Secondary Storage Enclosures 180, extending outwards from the First Storage Enclosure 168, may form a "daisy chain" of external cables. For example, a first external cable may connect the Second Storage Enclosure 170 to the First Storage Enclosure 168, and a second external cable may connect the Third Storage Enclosure 172 to the Second Storage Enclosure 170. Such external cables connecting the individual ones of the storage enclosures in Secondary Storage Enclosures 180 may each consist of or include one or more SAS cables, one or more Ethernet cables, and/or other specific types of external cables.

Data Storage System 116 may include one or more storage processors like Storage Processor 120. In some embodiments, multiple storage processors may be provided as circuit board assemblies, or "blades," which plug into a chassis that encloses and cools the storage processor. Those skilled in the art will recognize, however, that no particular configuration of storage processors is required, as any number of storage processors, including a single storage processor, may be provided and that Storage Processor 120 may be any type of physical or virtual computing device that is capable of processing host I/O requests.

Network 114 may include or consist of any type of network or combination of networks, such as, for example, a storage area network (SAN), a local area network (LAN), a wide area network (WAN), the Internet, and/or some other type of network or combination of networks.

Hosts 110(1-N) and/or host applications executing in whole or in part on Hosts 110(1-N) may logically connect to and communicate with the Storage Processor 120 using various technologies. For example, Host I/O Requests 112 conveyed from Hosts 110(1-N) to Storage Processor 120 may include block I/O requests (read requests and/or write requests) that are communicated from Hosts 110(1-N) to Storage Processor 120 using block storage interfaces and protocols such as, for example, the Small Computer System Interface (SCSI), Fibre Channel (FC), Serial Attached SCSI (SAS), Internet Small Computer System Interface (iSCSI), and/or other block storage interfaces and/or protocols. Host I/O Requests 112 conveyed from Hosts 110(1-N) to Storage Processor 120 may further include file I/O requests (read requests and/or write requests) communicated from Hosts 110(1-N) to the Storage Processor 120 using file storage interfaces and protocols such as, for example, the Network File System (NFS) distributed file system protocol, the Server Message Block (SMB)/Common Internet File System (CIFS) application-layer network protocol, Apple Filing Protocol (AFP), and/or other file storage interfaces and/or protocols. Storage Processor 120 may accordingly be configured to receive host I/O requests through block-based and/or file-based storage protocols, and to respond to host I/O requests of either type by reading host data from or writing host data to the non-volatile data storage devices contained in the storage enclosures.

Storage Processor 120 may include one or more Communication Interfaces 122, Processing Circuitry 124, and Memory 130. The Communication Interfaces 122 of Storage Processor 120 may include, for example, SCSI target adapters and/or network interface adapters that convert electronic and/or optical signals received over Network 114 into electronic form for use by Storage Processor 120.

Processing Circuitry 124 may be embodied as at least one processor core that is capable of reading and executing threads of program instructions as they are scheduled for execution. Processing Circuitry 124 may be integrated into a single central processing unit chip or chip package. Processing Circuitry 124 may be a subset of the processor cores contained in Storage Processor 120, or may be the only processor core contained in Storage Processor 120.

Memory 130 may, for example, include or consist of relatively high speed, volatile memory, e.g. Dynamic Random Access Memory (DRAM). Processing Circuitry 124 and Memory 130 together may form specialized control circuitry, which is constructed and arranged to carry out specific methods and functions as described herein. As shown in FIG. 1, Memory 130 stores specialized software components and data structures that may be provided at least in part in the form of executable program instructions. When the executable instructions of the software components shown in FIG. 1 are executed by Processing Circuitry 124, Processing Circuitry 124 performs the methods and functionality of the software described herein. Although certain specific software constructs are shown in FIG. 1 and described herein, those skilled in the art will recognize that Memory 130 may further include various other types of software constructs, which are not shown.

In the example of FIG. 1, the software components in Memory 130 include Host I/O Processing Logic 140, which provides program logic for processing and/or supporting the processing of the Host I/O Requests 112 received by Storage Processor 120, and program logic for providing one or more data services. Host I/O Requests 112 may be processed by Host I/O Processing Logic 140, and may include host I/O requests (e.g. host I/O read requests and host I/O write requests) that are directed to various types of block data objects that are hosted by Data Storage System 116 using non-volatile data storage space that is allocated from the non-volatile data storage devices in one or more of the storage enclosures. Such block data objects may, for example, include logical volumes, logical units sometimes referred to as LUNs), and/or block-based virtual volumes (VVols). Host I/O Requests 112 processed by Host I/O Processing Logic 140 may also or alternatively include host I/O requests (e.g. host I/O read requests, host I/O write requests) directed to file data objects, such as files or file systems, that are also hosted by Data Storage System 116 using non-volatile data storage space that is also allocated from the non-volatile data storage devices in one or more of the storage enclosures.

During operation of the components shown in FIG. 1, Selective Allocation Logic 162 selectively allocates non-volatile data storage space for storing Data Storage Metadata 154 from the non-volatile data storage devices that are contained in the First Storage Enclosure 168. For example, data storage space located on the non-volatile data storage devices in each one of the storage enclosures may be organized by Host I/O Processing Logic 140 for purposes of allocation (e.g. by Selective Allocation Logic 162) into equal-sized physical extents (PEs), where each physical extent consists of a contiguous area of physical data storage space. The disclosed technology may be embodied using any specific size of physical extents.

Some number of the physical extents located in the non-volatile data storage devices of each storage enclosure may be available for allocation by Selective Allocation Logic 162. In FIG. 1 for example, Available Physical Extents 174 are located on the non-volatile data storage devices contained in First Storage Enclosure 168, Available Physical Extents 176 are located on the non-volatile data storage devices contained in Second Storage Enclosure 170, and Available Physical Extents 178 are located on the non-volatile data storage devices contained in Third Storage Enclosure 172.

Selective Allocation Logic 162 selectively allocates data storage space (e.g. physical extents) from the non-volatile data storage devices contained in First Storage Enclosure 168 for storing data storage metadata. For example, Selective Allocation Logic 162 may allocate some number of physical extents for storing data storage metadata from the non-volatile data storage devices contained in First Storage Enclosure 168, and the indications of those physical extents that were allocated for storing data storage metadata are shown for purposes of illustration in FIG. 1 by Allocated Physical Extents 166. Allocated Physical Extents 166 may include or consist of any specific type of indications of the locations of the physical extents that have been allocated from the non-volatile data storage devices contained in First Storage Enclosure 168, such as, for example, offsets, pointers, addresses, etc. The physical extents allocated for storing data storage metadata are allocated from available data storage space in the non-volatile data storage devices contained in the First Storage Enclosure 168, e.g. from Available Physical Extents 174. In some embodiments, the physical extents indicated by Allocated Physical Extents 166 may be allocated by Selective Allocation Logic 162 exclusively from non-volatile data storage devices contained in First Storage Enclosure 168, and may then be used exclusively for storing Data Storage Metadata 154. In other words, Selective Allocation Logic 162 may selectively allocate all the physical extents indicated in Allocated Physical Extents 166 only from available physical extents that are located on non-volatile data storage devices contained in First Storage Enclosure 168, e.g. only from Available Physical Extents 174.

In some embodiments, Selective Allocation Logic 162 may selectively allocate the physical extents that are indicated by Allocated Physical Extents 166 from the available data storage space that is located in the non-volatile data storage devices contained in First Storage Enclosure 168 (e.g. from Available Physical Extents 174) over any other available data storage space that is located in the non-volatile data storage devices contained in any of the Secondary Storage Enclosures 180 (e.g. over Available Physical Elements 176 and/or Available Physical Elements 178). In this way, Selective Allocation Logic 162 may cause Data Storage Metadata 154 to be preferentially stored in data storage space that is located in the non-volatile data storage devices that are contained in First Storage Enclosure 168. For example, Selective Allocation Logic 162 may select all the physical extents indicated in Allocated Physical Extents 166 from Available Physical Extents 174 even when the number of physical extents in Available Physical Extents 176 and/or Available Physical Extents 178 is non-zero, and/or even when the number of physical extents in Available Physical Extents 176 and/or Available Physical Extents 178 is greater than the number of physical extents in Available Physical Extents 174.

In some embodiments, Selective Allocation Logic 162 may allocate some pre-determined initial amount of data storage space from the non-volatile data storage devices contained in First Enclosure 168 for storing Data Storage Metadata 154 when the Data Storage System 116 is initially started, and then subsequently maintain a pre-determined minimum amount of data storage space that is allocated from the non-volatile data storage devices contained in the First Enclosure 168 that is available for storing Data Storage Metadata 154. In response to detecting that the amount of available data storage space allocated from the non-volatile data storage devices contained in the First Storage Enclosure 168 for storing Data Storage Metadata 154 has become less than some predetermined minimum threshold, Selective Allocation Logic 162 may initiate the allocation of additional data storage space from the non-volatile data storage devices contained in First Enclosure 168 for storing Data Storage Metadata 154, e.g. by allocating one or more additional physical extents from Available Physical Extents 174, and including indications of those additionally allocated physical extents in Allocated Physical Extents 166.

Allocated Physical Extents 166 are passed to Metadata Tier 164, in order for the locations of the physical extents in the non-volatile data storage devices contained in First Storage Enclosure 168 that have been allocated for storing Data Storage Metadata 154 to be used by Metadata Tier 164. Metadata Tier 164 may include program logic and/or data structures that provide a logical address space into which Data Storage Metadata 154 can be written, and that map individual blocks within that logical address space to the locations of corresponding blocks of non-volatile data storage within the physical extents indicated by Allocated Physical Extents 166.

Metadata Generating Logic 156 may generate Data Storage Metadata 154, and then write Data Storage Metadata 154 into the logical address space provided by Metadata Tier 164. In response to Metadata Generating Logic 156 writing Data Storage Metadata 154 into the logical address space provided by Metadata Tier 164, mapping logic in Metadata Tier 164 determines the corresponding portions of the physical extents indicated by Allocated Physical Extents 166 that are mapped to the portion(s) of the logical address space provided by Metadata Tier 164 into which Data Storage Metadata 154 is written by Metadata Generating Logic 156, and then stores Data Storage Metadata 154 into those corresponding portions of the physical extents indicated by Allocated Physical Extents 166. In this way, Data Storage Metadata 154 is stored into the physical, non-volatile data storage space that was selectively allocated from the non-volatile data storage devices contained in First Storage Enclosure 168.

Selective Allocation Logic 162 may also selectively allocate data storage space for storing host data that is indicated by or included in one or more write I/O requests within Host I/O Requests 112, e.g. Host Data 152. For example, Selective Allocation Logic 162 may allocate some number of physical extents for storing Host Data 152, and indications of the locations of those physical extents that are allocated for storing Host Data 152 are illustrated in FIG. 1 by Allocated Physical Extents 158. The data storage space allocated for storing Host Data 152 is allocated from available data storage space located in the non-volatile data storage devices contained in both i) the First Storage Enclosure 168, and ii) the Secondary Storage Enclosures 180. In other words, Allocated Physical Extents 158 includes indications of physical extents allocated from Available Physical Extents 174, Available Physical Extents 176, and Available Physical Extents 178. In some embodiments, the allocated physical extents indicated by Allocated Physical Extents 158 may be allocated by Selective Allocation Logic 162 exclusively for storing Host Data 152, and are not used for storing any of Data Storage Metadata 154.

Allocated Physical Extents 158 are passed to and used by Host Data Tier 160. Host Data Tier 160 may include program logic and/or data structures that provide a logical address space into which Host Data 152 can be written, and that map individual blocks within that logical address space to the locations of corresponding blocks of non-volatile data storage within the physical extents indicated by Allocated Physical Extents 158.

Host I/O Processing Logic 140 may write Host Data 152 into the logical address space provided by Host Data Tier 160. In response to Host I/O Processing Logic 140 writing Host Data 152 to the logical address space provided by Host Data Tier 160, Host Data Tier 160 determines the portions (e.g. blocks) of the physical extents indicated Allocated Physical Extents 158 that are mapped to the portion(s) of the logical address space provided by Host Data Tier 160 into which Host Data 152 is written, and then stores Host Data 152 into those portions of the physical extents. In this way, Host Data 152 is stored into physical data storage space that is selectively allocated from the non-volatile data storage devices contained in both the First Storage Enclosure 168 and in the Secondary Storage Enclosures 180.

Figure 2:
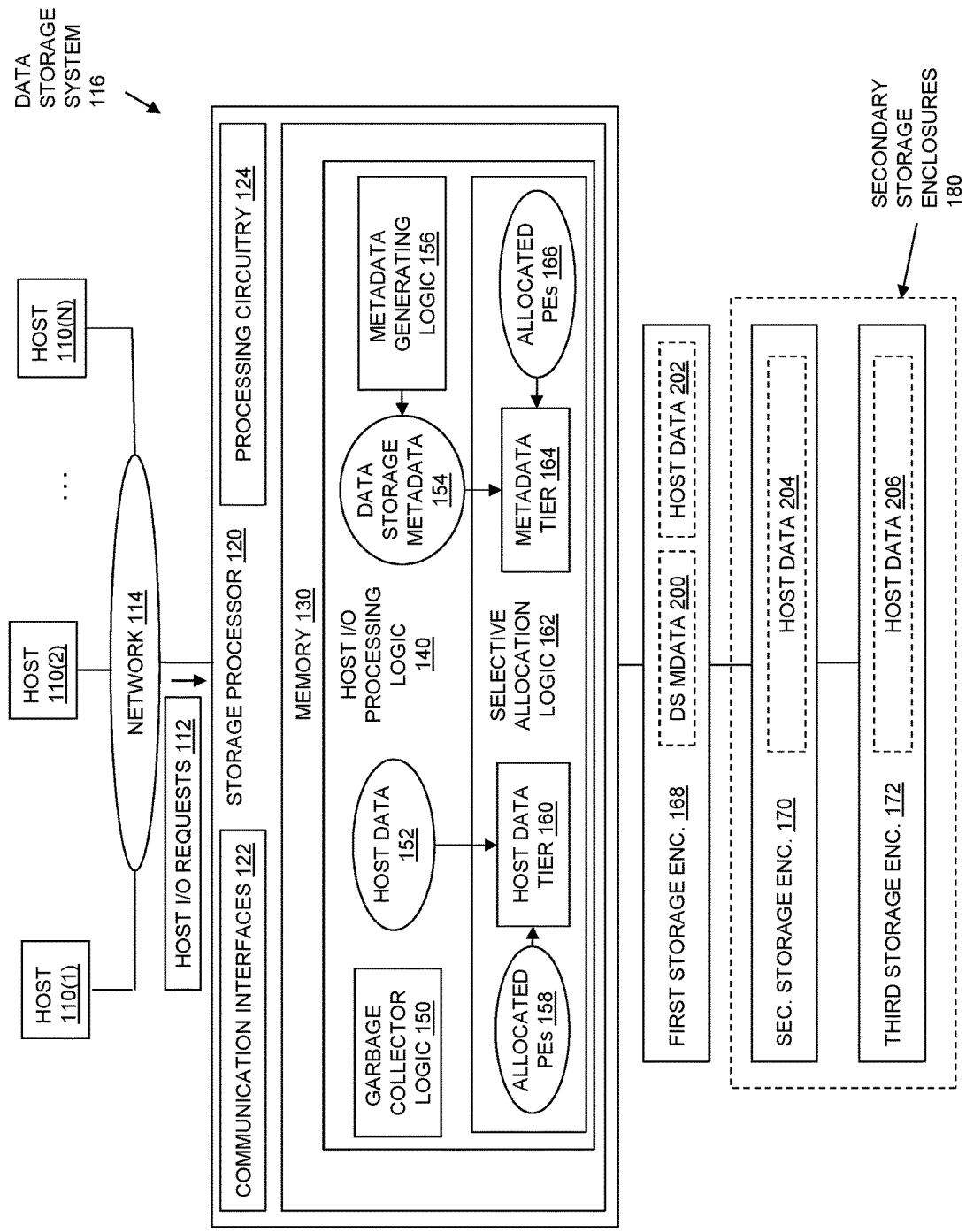
FIG. 2 is a block diagram showing the components in the example of FIG. 1 after storage of data storage metadata into the selectively allocated data storage space located in non-volatile data storage devices that are contained in the first storage enclosure.

FIG. 2 shows the components from the example of FIG. 1 after the operations described above with reference to FIG. 1 have been performed, resulting in Data Storage Metadata 154 being stored into data storage space allocated from the non-volatile data storage devices contained in First Storage Enclosure 168, and resulting in Host Data 152 being stored into data storage space allocated from non-volatile data storage devices contained in the First Storage Enclosure 168 and from the non-volatile data storage devices contained in the Secondary Storage Enclosures 180. As shown in FIG. 2, Data Storage Metadata 154 has been persistently stored as Data Storage Metadata 200, which is located in physical extents located in the non-volatile data storage devices contained in First Storage Enclosure 168. As also shown in FIG. 2, Host Data 152 has been persistently stored as i) Host Data 202, which is located in physical extents located in the non-volatile data storage devices contained in First Storage Enclosure 168, ii) Host Data 204, which is located in physical extents located in the non-volatile data storage devices contained in Second Storage Enclosure 170, and iii) Host Data 206, which is located in physical extents located in the non-volatile data storage devices contained in Third Storage Enclosure 172.

In some embodiments, Data Storage Metadata 154 may be evenly distributed across all of the non-volatile data storage devices contained in the First Storage Enclosure 168. In such embodiments, program logic within Metadata Tier 164 may operate to store the same amount of Data Storage Metadata 154 on each one of the non-volatile data storage devices contained in First Storage Enclosure 168. As a result, Data Storage Metadata 200 may be evenly distributed across the non-volatile data storage devices contained in the First Storage Enclosure 168, in order to provide load balancing and/or high levels of parallel component utilization when the Storage Processor 120 accesses Data Storage Metadata 200.

Figure 3:
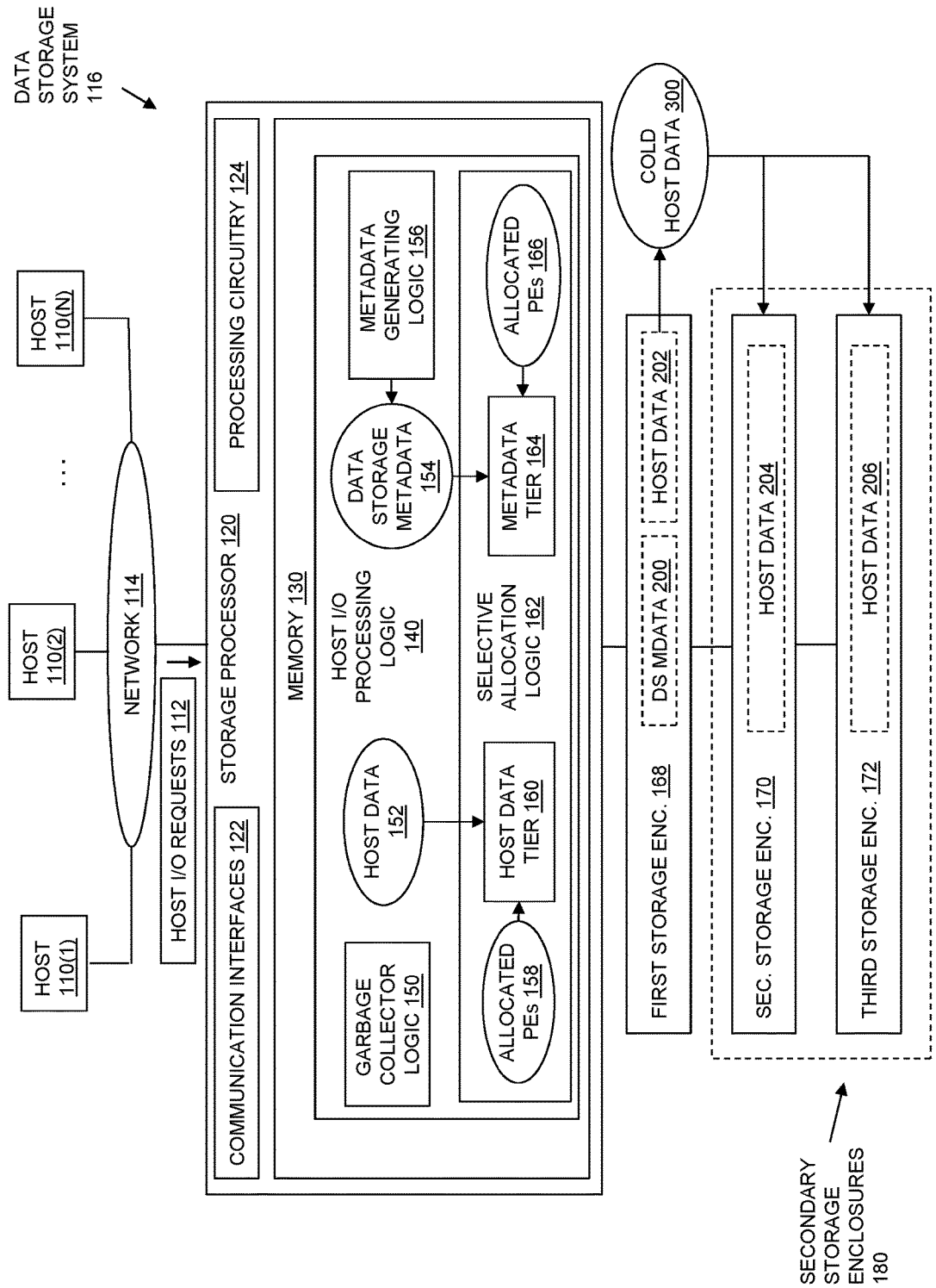
FIG. 3 is a block diagram showing the components in the examples of FIGS. 1 and 2 while identifying unused previously allocated data storage space and moving host data from non-volatile data storage devices contained in the first storage enclosure to non-volatile data storage devices contained in secondary storage enclosures, in order to create data storage space in the non-volatile data storage devices contained in the first enclosure that is available for allocation to store data storage metadata.

FIG. 3 shows the components in the examples of FIGS. 1 and 2 while unused previously allocated data storage space is identified in the non-volatile data storage devices contained in the First Storage Enclosure 168, and while host data is moved from non-volatile data storage devices contained in First Storage Enclosure 168 to non-volatile data storage devices contained in Secondary Storage Enclosures 180, in order to create available data storage space in the non-volatile data storage devices contained in the First Enclosure 168 for allocation to store data storage metadata, e.g. to increase the number of physical extents in Available Physical Extents 174 (see FIG. 1).

For example, Garbage Collector Logic 150 may consist of or include a background process that performs garbage collection techniques to identify previously allocated physical extents that are located in the non-volatile data storage devices contained in First Storage Enclosure 168 and that are currently unused. For example, Garbage Collector Logic 150 may maintain and/or monitor reference counts that are associated with each of the physical extents located on the non-volatile data storage devices contained in First Storage Enclosure 168. For a given physical extent, a corresponding reference count may be maintained that indicates a total number of references (e.g. pointers) to that physical extent that currently exist in data structures and/or processes within the Data Storage System 116. As such references to the physical extent are added, the reference count is increased, and as references to the physical extent are deleted, the reference count is decremented. When the reference count for a physical extent reaches zero, then the physical extent is unused, and can be made available for re-allocation, e.g. for allocation by Selective Allocation Logic 162 in order to store Data Storage Metadata 154. When Garbage Collector Logic 150 determines that the reference count for a previously allocated physical extent located on a non-volatile data storage device contained in First Storage Enclosure 168 has been decremented to zero, Garbage Collector Logic 150 may identify that physical extent as unused. The Garbage Collector Logic 150 may then add that unused physical extent to Available Physical Extents 174, e.g. for allocation by Selective Allocation Logic 162 to store Data Storage Metadata 154. In this way, Garbage Collector Logic 150 may identify unused data storage space in the non-volatile data storage devices contained in the First Storage Enclosure 168 in order to create data storage space that is available for allocation to store Data Storage Metadata 154.

In some embodiments, Garbage Collector Logic 150 may also operate to move host data from the non-volatile data storage devices contained in the First Storage Enclosure 168 to non-volatile data storage devices contained in Secondary Storage Enclosures 180, also in order to create data storage space available for allocation by Selective Allocation Logic 162 from non-volatile data storage devices contained in the First Storage Enclosure 168 to store the Data Storage Metadata 154. For example, Garbage Collector Logic 150 may identify one or more physical extents that are located on the non-volatile data storage devices contained in First Storage Enclosure 150 and that currently are being used to store what is generally referred to as "cold" host data. Such cold host data is host data that has been stored by Storage Processor 120 into the non-volatile data storage devices of First Storage Enclosure 150, but is rarely used or accessed. In response to detecting such cold host data, the Garbage Collector Logic 150 moves the cold host data from the physical extents located in the non-volatile data storage devices contained in First Storage Enclosure 150 to one or more physical extents located on the non-volatile data storage devices that are contained in the Secondary Storage Enclosures 180, as shown in FIG. 3 by Cold Host Data 300. When cold host data is moved by Garbage Collector Logic 150 from a physical extent located on one of the non-volatile data storage devices contained in First Storage Enclosure 150 to a physical extent located on one of the non-volatile data storage devices contained in the Secondary Storage Enclosure 180, the physical extent located on the non-volatile data storage devices contained in First Storage Enclosure 168 can be made available for allocation by Selective Allocation Logic 162 to store Data Storage Metadata 154, e.g. by adding the physical extent from which the cold host data was moved to Available Physical Extents 168. Garbage Collector 150 may operate to move cold host data from physical extents located on the non-volatile data storage devices contained in the First Storage Enclosure 168 to physical extents located on the non-volatile data storage devices contained in the Secondary Storage Enclosures 180 without moving any data storage metadata from physical extents located on the non-volatile data storage devices contained in First Storage Enclosure 168, regardless of whether the data storage metadata is cold. Accordingly, Cold Host Data 300 only includes cold host data identified in Host Data 202, but does not include any of the Data Storage Metadata 200.

Figure 4:
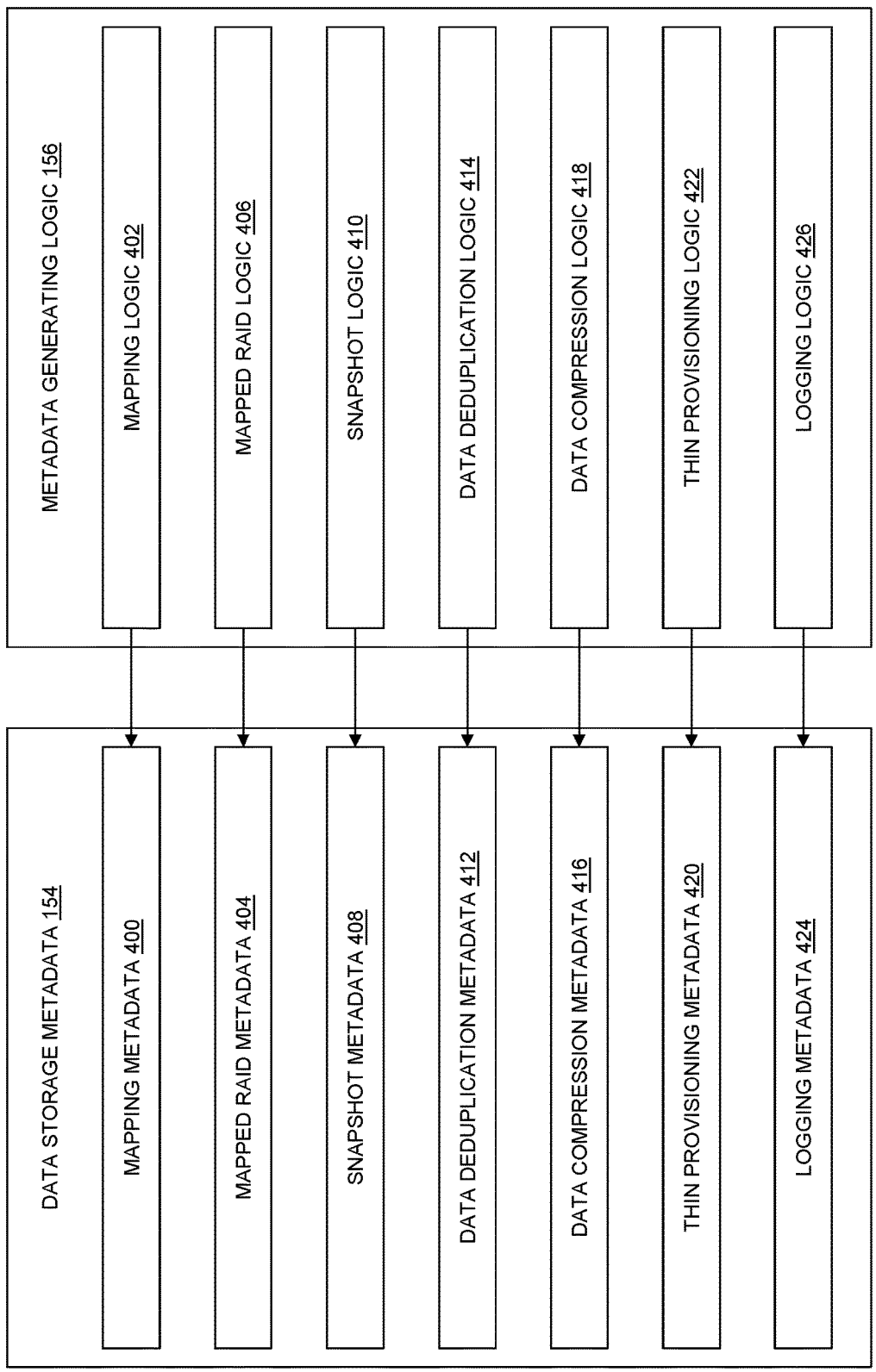
FIG. 4 is a block diagram illustrating an example of the generation of internal data storage metadata within the data storage system.

FIG. 4 is a block diagram illustrating an example of the types of internal data storage metadata that may be generated within the data storage system and stored within the data storage space located on the non-volatile data storage devices contained in the First Storage Enclosure 168. As shown in FIG. 4, in some embodiments Data Storage Metadata 154 may include or consist of one or more of the following types of data storage metadata: i) Mapping Metadata 400, ii) Mapped RAID Metadata 404, iii) Snapshot Metadata 408, iv) Data Duplication Metadata 412, v) Data Compression Metadata 416, vi) Thin Provisioning Metadata 420, and/or vii) Logging Metadata 424.

As further shown in FIG. 4, Metadata Generating Logic 156 may include or consist of one or more of the following types of metadata generating logic: i) Mapping Logic 402, ii) Mapped RAID Logic 406, iii) Snapshot 410, iv) Data Duplication Logic 414, v) Data Compression Logic 418, vi) Thin Provisioning Logic 422, and/or vii) Logging Logic 426.

For example, in some embodiments, Mapping Metadata 400 may include or consist of one or more mapping trees or the like that is generated by and/or used by Mapping Logic 402 to identify the locations of units of physical non-volatile storage (e.g. pages) that are mapped to corresponding portions of the logical address space of logical volumes that are accessed by host I/O requests received and processed by the data storage system. In some embodiments, Mapping Logic 402 may use the mapping tree to represent mappings between specific logical block addresses (LBAs) within a logical address space of the logical volume and corresponding physical pages of non-volatile data storage (e.g. in the non-volatile data storage devices contained in First Storage Enclosure 168 and/or Secondary Storage Enclosures 180) that are used to store host data written to those LBAs. Processing of each host I/O request received by the data storage system that is directed to a logical volume may include a traversal of that logical volume's mapping tree in order to identify the physical page of non-volatile data storage that corresponds to the LBA within the logical address space of the logical volume that is indicated by the host I/O request. In some embodiments, a mapping tree may, for example, consist of or include a tree data structure having multiple levels of nodes, including upper levels 1, 2, etc., a leaf level under the upper levels, a virtual block layer under the leaf level, and a physical block layer under the virtual block layer. In some embodiments, some number of the upper-most levels of the mapping tree may be stored in the memory of the data storage system, to facilitate higher speed access, while the remaining lower levels of the mapping tree may be included in Data Storage Metadata 154 for storage into data storage space within the non-volatile data storage devices contained in First Storage Enclosure 168. For example, each node above the physical block layer of the mapping tree may contain a maximum of N (e.g. 512) pointers to next lower level nodes, as follows:

Level 1: The top level, in which each node may contain a maximum of N pointers to Level 2 nodes.
Level 2: The next lower level after Level 1, in which each node may contain a maximum of N pointers to nodes in a next lower level.
. . . {other upper levels} . . .
Leaf Level: The level below the upper levels. The leaf level contains leaf nodes. Each leaf node maps a corresponding segment within the logical address space of the logical volume (e.g. a range of LBAs) to pointers in virtual blocks in a virtual block layer, and may contain a maximum of N pointers that each indicate a pointer contained in a virtual block within the Virtual Block Layer.
Virtual Block Layer: The level below the Leaf Level, containing virtual blocks that isolate LBAs in the logical volume's logical address space from pages of physical non-volatile data storage. Each virtual block in the virtual block layer corresponds to a physical block of contiguous non-volatile data storage, and may contain up to a maximum of N pointers to individual physical pages of non-volatile data storage within the corresponding physical block.
Physical Block Layer: The level below the Virtual Block Layer, containing physical blocks. Each physical block is a physically contiguous chunk of non-volatile data storage that may be used to store host data, and is made up of pages that may be indicated by pointers contained in the corresponding virtual block.

The above example of a mapping tree is given only for purposes of explanation, and those skilled in the art will recognize that embodiments of the disclosed technology are not limited to embodiments using any specific type or configuration of mapping metadata and/or mapping tree within such mapping metadata.

Mapped RAID Metadata 404 may include or consist of metadata generated by and/or used by Mapped RAID Logic 406, such as metadata (e.g. one or more tables, etc.) that describes how host data written to a logical volume or the like is striped across physical extents of non-volatile storage that are allocated to support mapped RAID.

Snapshot Metadata 408 may include or consist of metadata generated by and/or used by Snapshot Logic 410, such as metadata that indicates and/or describes (e.g. points to) point in time copies referred to as "snapshots" that the Data Storage System 116 captures of storage objects such as logical volumes, LUNs (Logical Units), and/or other specific types of storage objects.

Data Deduplication Metadata 412 may include or consist of metadata generated by and/or used by Data Deduplication Logic 414, such as one or more data structures (e.g. a table or the like) that associate crypto-digests generated from previously stored blocks of host data with the locations in non-volatile storage at which the corresponding blocks of host data were stored.

Data Compression Metadata 416 may include or consist of metadata generated by and/or used by Data Compression Logic 418, such as indications (e.g. pointers) of locations in non-volatile storage at which previously compressed host data is stored, and/or indications of the specific type(s) of compression (e.g. compression keys, compression algorithms, etc.) that were used to compress the previously compressed host data.

Thin Provisioning Metadata 420 may include or consist of metadata generated by and/or used by Thin Provisioning Logic 422, such as a data structure (e.g. a bit map) indicating which portions of the logical address space of a data storage object (e.g. a thin LUN or logical volume) have been allocated non-volatile data storage to handle received host I/O requests directed to the data storage object.

Logging Metadata 424 may include or consist of metadata generated by and/or used by Logging Logic 426, such as a transaction log or the like storing metadata changes resulting from host I/O requests received by the Data Storage System 116, and that can be "replayed" to recover the data storage system to a consistent state after a system crash.

Figure 5:
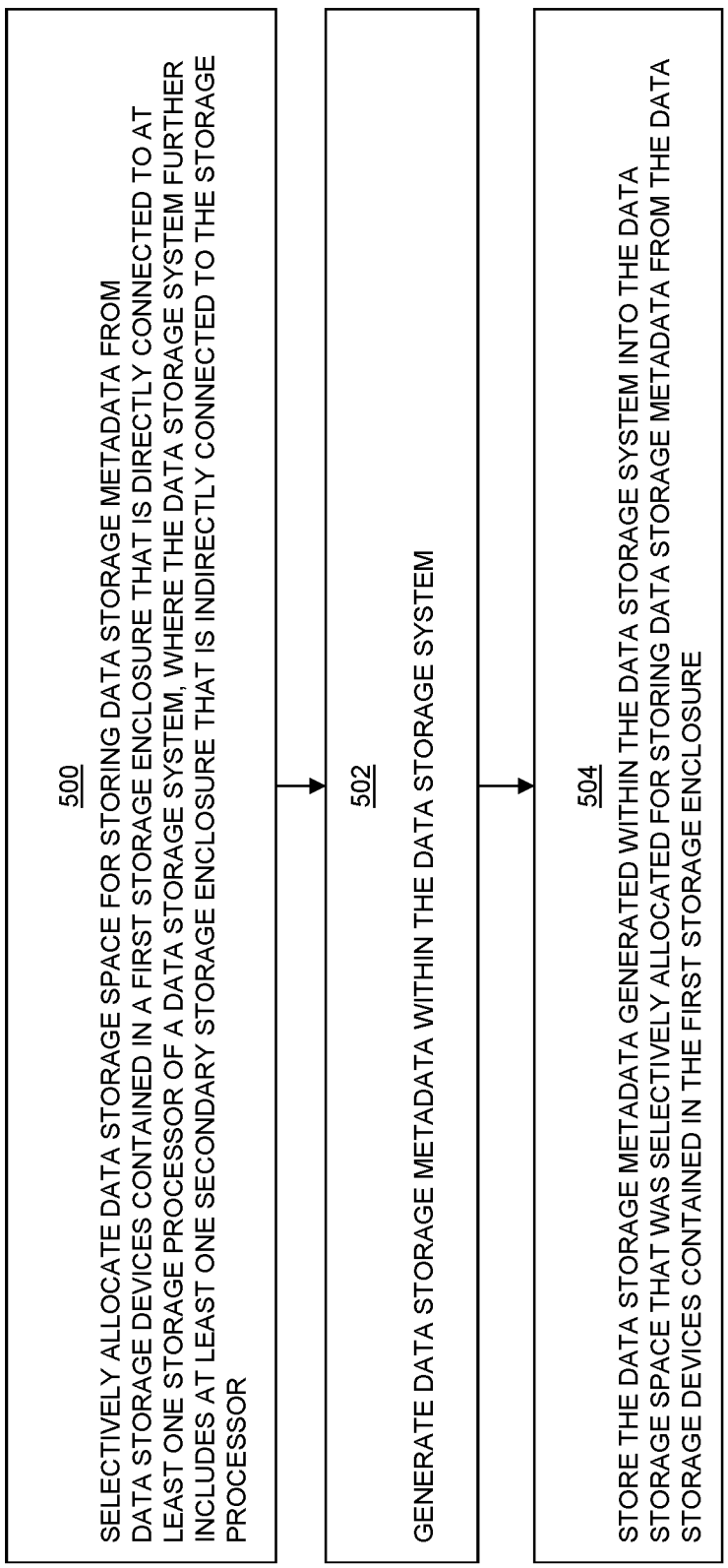
FIG. 5 is a flow chart illustrating steps that may be performed during operation of some embodiments.

FIG. 5 is a flow chart illustrating steps that may be performed during operation of some embodiments.

At step 500, data storage space is selectively allocated for storing data storage metadata from data storage devices contained in a first storage enclosure that is directly connected to at least one storage processor of a data storage system. The data storage system further includes at least one secondary storage enclosure that is indirectly connected to the storage processor.

At step 502, data storage metadata is generated within the data storage system.

At step 504, the data storage metadata generated within the data storage system is stored into the data storage space that was selectively allocated for storing data storage metadata from the data storage devices contained in the first storage enclosure.

As will be appreciated by those skilled in the art, the technologies disclosed herein may be embodied as a system, method or computer program product. Accordingly, each specific feature of the present disclosure may be embodied using hardware, software (including firmware, resident software, micro-code, etc.) or a combination of software and hardware. Furthermore, the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media.

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:

selectively allocating data storage space for storing data storage metadata from non-volatile data storage devices contained in a first storage enclosure that is directly connected to at least one storage processor of a data storage system through a high speed bus that physically connects the first storage enclosure directly to the storage processor, wherein the data storage system further includes at least one secondary storage enclosure that is indirectly connected to the storage processor through the first storage enclosure by way of at least one external cable including an external cable that is physically connected to the first storage enclosure, wherein the data storage space for storing the data storage metadata is selectively allocated at least in part by moving cold host data from the non-volatile data storage devices contained in the first storage enclosure to non-volatile data storage devices contained in the secondary storage enclosure, without moving any cold data storage metadata out of the non-volatile data storage devices in the first storage enclosure, in order to create data storage space that is available for allocation from non-volatile data storage devices contained in the first storage enclosure to subsequently store data storage metadata;

generating data storage metadata within the data storage system, wherein the data storage metadata includes a mapping tree that represents mappings between logical block addresses within a logical block address space of a logical volume and corresponding physical pages of non-volatile data storage in the non-volatile data storage devices in the first storage enclosure and in non-volatile data storage devices in the secondary storage enclosure, and wherein the mapping tree includes upper levels of nodes and lower levels of nodes; and storing the data storage metadata generated within the data storage system into the data storage space that was selectively allocated for storing data storage metadata from the non-volatile data storage devices contained in the first storage enclosure, at least in part by storing only the lower levels of nodes of the mapping tree within the data storage space that was selectively allocated for storing data storage metadata from the non-volatile data storage devices contained in the first storage enclosure, while storing the upper levels of nodes of the mapping tree within a memory contained in the storage processor of the data storage system, wherein the lower level nodes of the mapping tree include a leaf level of leaf nodes, wherein each leaf node maps a corresponding segment within the logical address space of the logical volume to pointers in virtual blocks within a virtual block layer of the mapping tree, and wherein each pointer in the virtual blocks points to an individual one of the pages of non-volatile data storage.

2. The method of claim 1, wherein selectively allocating data storage space for storing data storage metadata further includes selecting available data storage space located in the non-volatile data storage devices contained in the first storage enclosure over available data storage space located in non-volatile data storage devices contained in the secondary storage enclosure.

3. The method of claim 1, further comprising identifying unused data storage space in the non-volatile data storage devices contained in the first storage enclosure in order to create data storage space available for allocation from the non-volatile data storage devices contained in the first storage enclosure to store the data storage metadata.

4. The method of claim 3, further comprising evenly distributing the data storage metadata across the non-volatile data storage devices contained in the first storage enclosure such that each non-volatile data storage device contained in the first storage enclosure stores the same amount of data storage metadata.

5. The method of claim 4, wherein the logical address space of the logical volume is accessed by host I/O requests received from at least one host and processed by the data storage system.

6. The method of claim 1, wherein the at least one secondary storage enclosure comprises a plurality of secondary storage enclosures; and
wherein the at least one external cable comprises a plurality of external cables that form a daisy chain of external cables extending out from the first storage enclosure that connect the secondary storage enclosures to the storage processor through the first storage enclosure.

7. The method of claim 6, wherein the storage processor operates to process host I/O requests received by the storage processor from at least one host over a network; and
wherein the host I/O requests are directed to data objects hosted by the data storage system.

8. The method of claim 7, wherein the at least one secondary storage enclosure comprises at least one SAS (Serial Attached SCSI (Small Computer System Interface)) expander.

9. The method of claim 1, wherein at least a portion of the nodes in the upper levels of nodes of the mapping tree contain pointers to the nodes in the leaf level of leaf nodes within the mapping tree.

10. A data storage system, comprising:
processing circuitry and memory coupled to the processing circuitry in a storage processor of the data storage system, the memory storing instructions, wherein the instructions, when executed by the processing circuitry, cause the processing circuitry to:
selectively allocate data storage space for storing data storage metadata from non-volatile data storage devices contained in a first storage enclosure that is directly connected to the storage processor of the data storage system through a high speed bus that physically connects the first storage enclosure directly to the storage processor, wherein the data storage system further includes at least one secondary storage enclosure that is indirectly connected to the storage processor through the first storage enclosure by way of at least one external cable including an external cable that is physically connected to the first storage enclosure, wherein the data storage space for storing the data storage metadata is selectively allocated at least in part by moving cold host data from the non-volatile data storage devices contained in the first storage enclosure to non-volatile data storage devices contained in the secondary storage enclosure, without moving any cold data storage metadata out of the non-volatile data storage devices in the first storage enclosure, in order to create data storage space that is available for allocation from non- volatile data storage devices contained in the first storage enclosure to subsequently store data storage metadata;
generate data storage metadata within the data storage system, wherein the data storage metadata includes a mapping tree that represents mappings between logical block addresses within a logical block address space of a logical volume and corresponding physical pages of non-volatile data storage in the non-volatile data storage devices in the first storage enclosure and in non-volatile data storage devices in the secondary storage enclosure, and wherein the mapping tree includes upper levels of nodes and lower levels of nodes; and
store the data storage metadata generated within the data storage system into the data storage space that was selectively allocated for storing data storage metadata from the non-volatile data storage devices contained in the first storage enclosure, at least in part by storing only the lower levels of nodes of the mapping tree within the data storage space that was selectively allocated for storing data storage metadata from the non-volatile data storage devices contained in the first storage enclosure, while storing the upper levels of nodes of the mapping tree within the memory coupled to the processing circuitry in the storage processor of the data storage system, wherein the lower level nodes of the mapping tree include a leaf level of leaf nodes, wherein each leaf node maps a corresponding segment within the logical address space of the logical volume to pointers in virtual blocks within a virtual block layer of the mapping tree, and wherein each pointer in the virtual blocks points to an individual one of the pages of non-volatile data storage.

11. The data storage system of claim 10, wherein the instructions, when executed by the processing circuitry, further cause the processing circuitry to:
selectively allocate data storage space for storing data storage metadata at least in part by selecting available data storage space located in the non-volatile data storage devices contained in the first storage enclosure over available data storage space located in non-volatile data storage devices contained in the secondary storage enclosure.

12. The data storage system of claim 10, wherein the instructions, when executed by the processing circuitry, further cause the processing circuitry to:
identify unused data storage space in the non-volatile data storage devices contained in the first storage enclosure in order to create data storage space available for allocation from the non-volatile data storage devices contained in the first storage enclosure to store the data storage metadata.

13. The data storage system of claim 12, wherein the instructions, when executed by the processing circuitry, further cause the processing circuitry to:
evenly distribute the data storage metadata across the non-volatile data storage devices contained in the first storage enclosure such that each non-volatile data storage device contained in the first storage enclosure stores the same amount of data storage metadata.

14. The data storage system of claim 13, wherein the logical address space of the logical volume is accessed by host I/O requests received from at least one host and processed by the data storage system.

15. A computer program product, comprising:
a non-transitory, computer-readable medium having instructions stored thereon that, when executed by processing circuitry in a data storage system, cause the processing circuitry to perform a method comprising the steps of:
selectively allocating data storage space for storing data storage metadata from non-volatile data storage devices contained in a first storage enclosure that is directly connected to at least one storage processor of a data storage system through a high speed bus that physically connects the first storage enclosure directly to the storage processor, wherein the data storage system further includes at least one secondary storage enclosure that is indirectly connected to the storage processor through the first storage enclosure by way of at least one external cable including an external cable that is physically connected to the first storage enclosure, wherein the data storage space for storing the data storage metadata is selectively allocated at least in part by moving cold host data from the non-volatile data storage devices contained in the first storage enclosure to non-volatile data storage devices contained in the secondary storage enclosure, without moving any cold data storage metadata out of the non-volatile data storage devices in the first storage enclosure, in order to create data storage space that is available for allocation from non-volatile data storage devices contained in the first storage enclosure to subsequently store data storage metadata;
generating data storage metadata within the data storage system, wherein the data storage metadata includes a mapping tree that represents mappings between logical block addresses within a logical block address space of a logical volume and corresponding physical pages of non-volatile data storage in the non-volatile data storage devices in the first storage enclosure and in non-volatile data storage devices in the secondary storage enclosure, and wherein the mapping tree includes upper levels of nodes and lower levels of nodes; and
storing the data storage metadata generated within the data storage system into the data storage space that was selectively allocated for storing data storage metadata from the non-volatile data storage devices contained in the first storage enclosure, at least in part by storing only the lower levels of nodes of the mapping tree within the data storage space that was selectively allocated for storing data storage metadata from the non-volatile data storage devices contained in the first storage enclosure, while storing the upper levels of nodes of the mapping tree within a memory contained in the storage processor of the data storage system, wherein the lower level nodes of the mapping tree include a leaf level of leaf nodes, wherein each leaf node maps a corresponding segment within the logical address space of the logical volume to pointers in virtual blocks within a virtual block layer of the mapping tree, and wherein each pointer in the virtual blocks points to an individual one of the pages of non-volatile data storage.

16. The computer program product of claim 15, wherein the method performed by the processing circuitry when the instructions are executed further comprises:
selectively allocating data storage space for storing data storage metadata at least in part by selecting available data storage space located in the non-volatile data storage devices contained in the first storage enclosure over available data storage space located in non-volatile data storage devices contained in the secondary storage enclosure.

17. The computer program product of claim 15, wherein the method performed by the processing circuitry when the instructions are executed further comprises:
identifying unused data storage space in the non-volatile data storage devices contained in the first storage enclosure in order to create data storage space available for allocation from the non-volatile data storage devices contained in the first storage enclosure to store the data storage metadata.

18. The computer program product of claim 17, wherein the method performed by the processing circuitry when the instructions are executed further comprises:
evenly distributing the data storage metadata across the non-volatile data storage devices contained in the first storage enclosure such that each non- volatile data storage device contained in the first storage enclosure stores the same amount of data storage metadata.

19. The computer program product of claim 18, wherein the logical address space of the logical volume is accessed by host I/O requests received from at least one host and processed by the data storage system.

* * * * *